United States Patent
Ray

(10) Patent No.: US 10,090,922 B2
(45) Date of Patent: Oct. 2, 2018

(54) LOSS OF SIGNAL DETECTOR

(71) Applicant: Finisar Corporation, Sunnyvale, CA (US)

(72) Inventor: Sagar Ray, San Jose, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 15/648,912

(22) Filed: Jul. 13, 2017

(65) Prior Publication Data

US 2018/0026717 A1 Jan. 25, 2018

Related U.S. Application Data

(60) Provisional application No. 62/364,721, filed on Jul. 20, 2016.

(51) Int. Cl.
*H04B 10/69* (2013.01)
*H03F 3/45* (2006.01)
*H04B 10/079* (2013.01)

(52) U.S. Cl.
CPC ....... *H04B 10/07955* (2013.01); *H04B 10/69* (2013.01)

(58) Field of Classification Search
CPC .................. H04B 10/69; H03F 3/45
See application file for complete search history.

(56) References Cited

U.S. PATENT DOCUMENTS

2001/0004219 A1* 6/2001 Bangs ................. H03F 3/45085
327/65
2009/0027086 A1* 1/2009 Trifonov .............. H03K 3/3565
327/66

* cited by examiner

*Primary Examiner* — Shi K Li
(74) *Attorney, Agent, or Firm* — Maschoff Brennan

(57) ABSTRACT

A loss of signal (LOS) detector may include a comparator including a first input, a second input and an output indicating a LOS status. The LOS detector further includes circuitry to compare a first signal on the first input generated by differential input signals and a threshold signal common mode with a second signal on the second input generated by differential threshold signals at a first level and an input signal common mode. The circuit further configured to generate a LOS indicator on the output based on the compare.

20 Claims, 6 Drawing Sheets

LOSS OF SIGNAL DETECTOR

CROSS-REFERENCE TO RELATED APPLICATION

A claim for benefit of priority to the Jul. 20, 2016 filing date of the U.S. Patent Provisional Application No. 62/364,721, titled LOSS OF SIGNAL DETECTOR (the '721 Provisional Application), is hereby made pursuant to 35 U.S.C. § 119(e). The entire disclosure of the '721 Provisional Application is hereby incorporated herein.

TECHNICAL FIELD

Embodiments described herein generally relate to optical receivers and, more particularly, to detection of loss of a received signal.

BACKGROUND

In optical data transmission networks, optical signal reception sensitivity specifications for an optical receiver are defined for a given physical interface specification according to the data rate of the optical signal. As such, it can be determined when compared to a threshold signal, that the receive power of an optical signal received by the optical receiver has fallen below accepted parameters, as defined by a particular sensitivity specification. When such a situation occurs, the optical receiver can issue a "loss of signal" ("LOS") alert or status to notify a host system operably connected to the optical receiver that the relative strength of the received optical signal is such that correct transmission of the data contained in the optical signal may be interrupted. If such an alert or status is received, the host system can then initiate corrective procedures to rectify the problem condition.

Optical signals and threshold signals are subjected to common mode voltages which can affect the determination of the loss of signal. Conventional LOS detectors remain vulnerable to common mode voltage levels of the received signal and the threshold signal and differences between the respective common mode voltages of the received signal and threshold signal.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION

Figure 1:
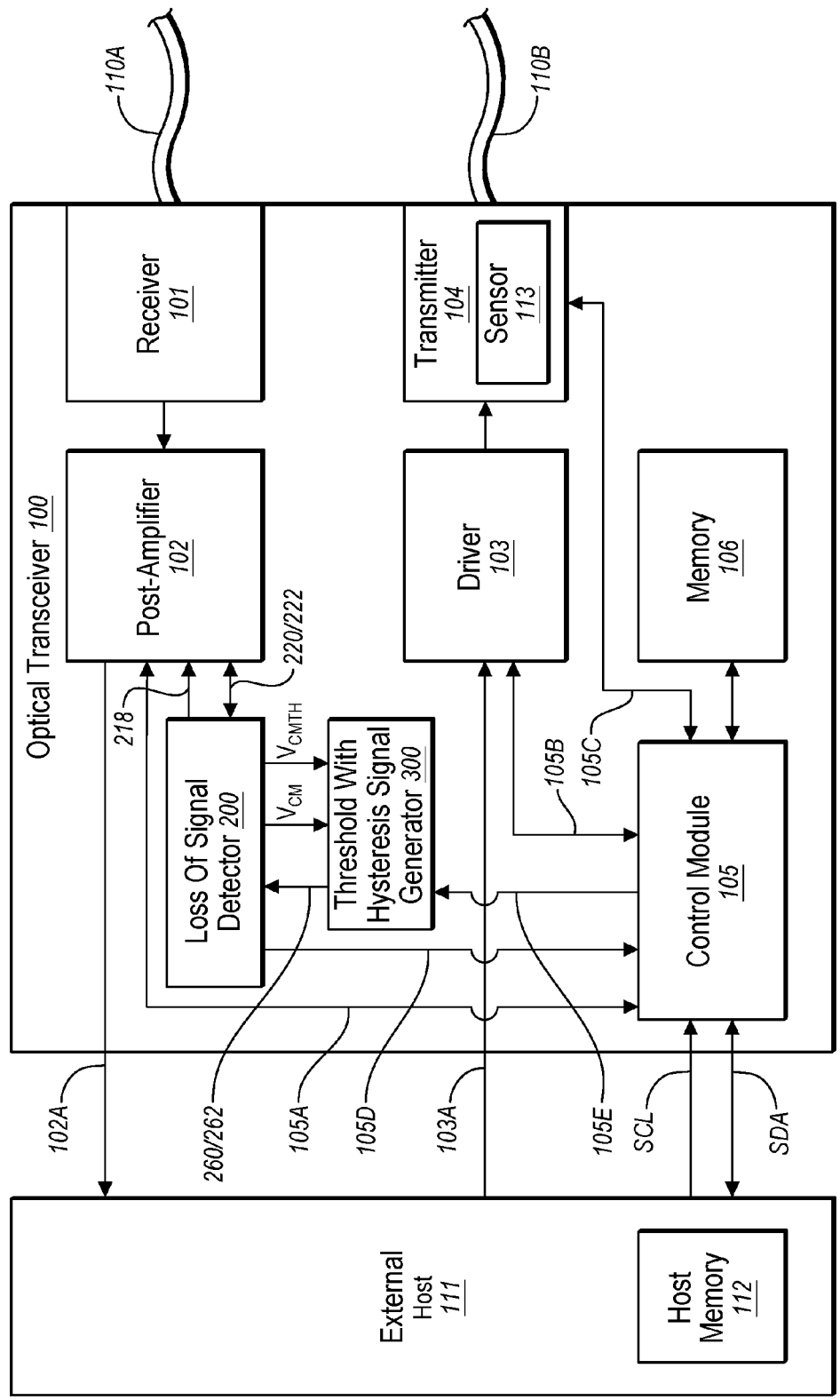
FIG. 1 illustrates an optical transceiver, in accordance with an exemplary embodiment.

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. As used herein, a signal on a conductor may simply be referred to as the "signal" rather than the signal on a conductor or node.

Some embodiments described herein relate to an improved system and method for signal detection of valid signals. More specifically, the improved signal detector system and method provides common mode immunity or improvement nearing immunity in an LOS detector. The LOS detector is further configured to have precise and programmable threshold and hysteresis control.

The disclosed embodiments provide an implementation of an LOS detector that may be utilized in transceivers to indicate either the absence or substantial presence of a valid signal in the presence of noise thus allowing other receiver circuitry to make specific decisions based on the decision.

The system and method use a rectifier arrangement that has at least two features: (1) the threshold voltage corresponding directly to the amplitude of the signal itself can be set by applying a voltage across the reference inputs of the detector circuit and (2) the common mode of the signal and the generated differential threshold voltage does not have to be the same due to the presence of a cross-coupled common mode rejection circuit.

Moreover, the detector circuit does not need to operate fast since only the difference of signal and threshold power is extracted and the data excursions are rejected. The high output impedance of, for example, a PMOS load configuration creates a natural filter for the aforementioned rejection, thus obviating the need of area-consuming capacitors. Furthermore, the circuit can be designed with low supply voltage and power dissipation by trading the device speed. In order to avoid chatter, hysteresis can be implemented by adding a hysteresis current to the threshold current that flows through the threshold voltage generating resistor.

Moreover, the threshold voltage itself can be tuned to circumvent the process/mismatch and temperature variations by controlling the threshold current. Although the generation of the differential threshold voltage does not require the common mode of the threshold be the same as the signal, it is beneficial to make them close in the presence of device and circuit mismatch.

In general, embodiments of the present invention relate to adjustable loss of signal detection threshold levels in, for example, an optical transceiver coupled to a host computing system (hereinafter also referred to simply as a "host"). An LOS detector detects when the receive power drops below a threshold. However, in this case, instead of the loss of signal level threshold being static, a loss of signal level adjustment mechanism changes the loss of signal level threshold creating hysteresis as directed by a control module.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention may be implemented in optical (e.g., laser) transmitter/receivers of any form factor such as XFP, SFP and SFF, without restriction. Furthermore, the principles of the present invention are suitable for other non-optical communication links.

The optical transceiver 100 receives an optical signal from fiber 110A using receiver 101. The receiver 101 acts as an opto-electric transducer by transforming the optical signal into an electrical signal. For example, the receiver 101 may be a photodiode. The receiver 101 provides the resulting electrical signal to a post-amplifier 102. A loss of signal (LOS) detector 200 receives a differential input signal $V_{IN}$+ 220 and $V_{IN}$− 222 from the post amplifier 102. The LOS detector 200 detects when the receive power of the differential input signals $V_{IN}$+ 220 and $V_{IN}$− 222 are above (or below) differential threshold signals $V_{TH}$+ 260 and $V_{TH}$− 262. The post-amplifier 102 is further connected to the LOS detector 200 by a loss of signal (LOS) indicator 218. The LOS detector 200 asserts the LOS indicator 218 when the received power of the differential input signals $V_{IN}$+ 220 and $V_{IN}$− 222 fall below programmable differential threshold signals $V_{TH}$+ 260 and $V_{TH}$− 262, and de-asserts when the received power rises above the programmable differential threshold signals $V_{TH}$+ 260 and $V_{TH}$− 262.

When the LOS indicator 218 is not asserted, the post-amplifier 102 amplifies the signal and provides the amplified signal 102A to an external host 111. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Although the principles of the present invention mainly relate to the receive path just described, the transmit path of the optical transceiver 100 will also be described for the sake of completeness. Specifically, the laser driver 103 receives the electrical signal 103A, and drives the transmitter 104 (e.g., a laser or Light Emitting Diode ("LED")) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, receive power fluctuations, and feedback conditions may each affect the performance of these components. Accordingly, the optical transceiver 100 includes a control module 105, which may evaluate the receive power and transmit power, and obtain information/settings 105A from the post-amplifier 102 and information/settings 105B from the laser driver 103. This allows the control module 105 to optimize the dynamically varying performance, and additionally detect when the receive power drops below a programmable loss of signal assert level by obtaining information/settings 105D from the loss of signal detector 200.

Specifically, the control module 105 may counteract these changes by adjusting information/settings 105A on the post-amplifier 102 and/or information/settings 105B on the laser driver 103. These settings adjustments are quite intermittent since they are only made when temperature or voltage or other low frequency changes so warrant. An example of such low frequency changes are the assertion and de-assertion of the loss of signal level due to slowly fluctuating receive power levels. In accordance with the principles of the present invention, settings of the receive power at which the loss of signal detector 200 asserts or de-asserts the LOS indicator 218 may be programmed and changed by information/settings 105D from the control module 105.

The control module 105 may also generate control signals C0-Cn, such as control signals 105E for controlling a current digital-to-analog converter (IDAC) 334 (FIG. 3) in a threshold with hysteresis signal generator 300. The threshold with hysteresis signal generator 300 generates differential threshold signals Vth+ 260 and Vth− 262 to LOS detector 200 to adjust the threshold voltage in the LOS detector 200, as further described below. As further described below, the control signals 105E include threshold control signals C0-Cx for adjusting the threshold signal level and hysteresis control signals Cx+1-Cn for adjusting the threshold signal to achieve hysteresis control and stability for the LOS indicator 218.

The control module 105 may have access to a memory 106 for storing threshold and hysteresis control signals, such as control signals 105E for the LOS detector 200. Alternatively, data and clock signals may be provided from the host 111 to the control module 105 using any host interface, such as the serial clock line ("SCL") and the serial data line ("SDA"), to provide the threshold and hysteresis control signals to the LOS detector 200.

Figure 2:
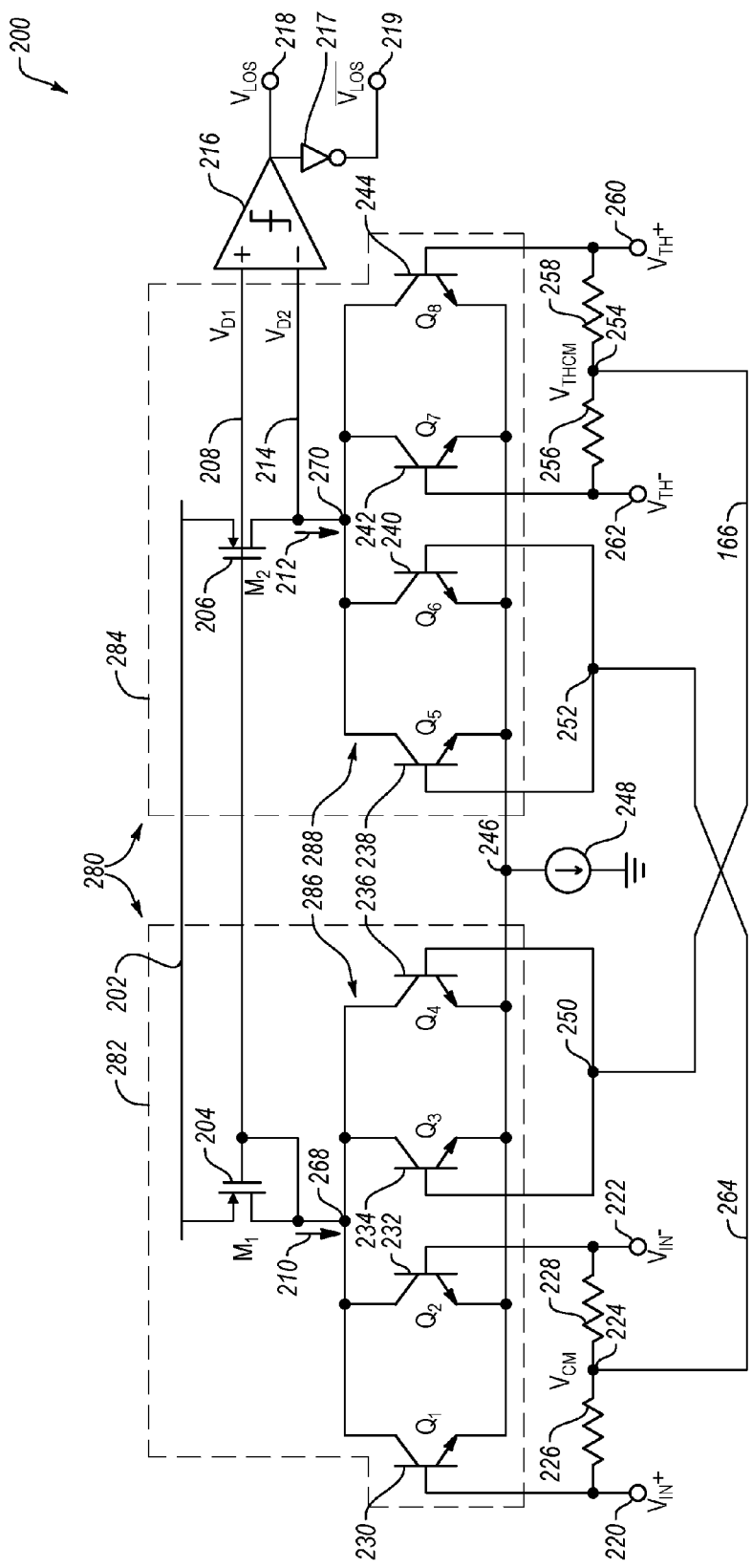
FIG. 2 illustrates a circuit diagram of a loss of signal (LOS) detector, in accordance with an exemplary embodiment.

FIG. 2 illustrates a circuit diagram of an LOS detector 200, such as LOS detector 200 of FIG. 1. The LOS detector 200 includes a current mirror 280 coupled to a comparator 216 having an output generating the LOS indicator 218 and an inverted LOS indicator 219 generated by an inverter device 217. The current mirror 280 includes an input stage 282 coupled to a first input $V_{D1}$ 208 of the comparator 216 and an output stage 284 coupled to a second input $V_{D2}$ 214 of the comparator 216. The input stage 282 and the output stage 284 together couple to a constant current source 248.

The input stage 282 may include an input pullup PMOS transistor 204 coupled at a source to a pullup voltage 202 and coupled at a drain to a bias stage 286. The drain and gate of the input pullup transistor 204 are shorted together. The bias stage 286 includes, for example, a plurality of bipolar junction transistors (BJTs) 230, 232, 234 and 236 coupled in parallel with the respective commonly coupled collectors coupled to the drain of the input pullup transistor 204 and the respective commonly coupled emitters coupled at node 246 to the constant current source 248.

Bases of the plurality of transistors 230 and 232 are coupled to differential input signals $V_{IN}$+ 220 and $V_{IN}$− 222. The differential input signals $V_{IN}$+ 220 and $V_{IN}$− 222 may correspond to the differential input signals $V_{IN}$+ 220 and $V_{IN}$− 222 of FIG. 1. The differential input signals $V_{IN}$+ 220 and $V_{IN}$− 222 are coupled together by preferably equal valued resistors 226 and 228 at a node to generate thereon an input signal common mode $V_{CM}$ 224. The input signal common mode $V_{CM}$ 224 in operation exhibits the common mode voltage of the differential input signals $V_{IN}$+ 220 and $V_{IN}$- 222.

The output stage 284 may include an output pullup transistor 206 coupled at a source to a pullup voltage 202 and coupled at a drain to a load stage 288. The load stage 288 includes, for example, a plurality of BJT transistors 238, 240, 242 and 244 coupled in parallel with the respective commonly coupled collectors coupled to the drain of the output pullup transistor 206 and the respective commonly coupled emitters coupled at the node 246 to the constant current source 248.

Bases of the plurality of transistors 242 and 244 are coupled to differential threshold signals $V_{TH}$+ 260 and $V_{TH}$- 262. The differential threshold signals $V_{TH}$+ 260 and $V_{TH}$- 262 may correspond to the differential threshold signals $V_{TH}$+ 260 and $V_{TH}$- 262 of FIG. 1. The differential threshold signals $V_{TH}$+ 260 and $V_{TH}$- 262 are coupled together by preferably equal valued resistors 256 and 258 at a node to generate thereon a threshold signal common mode $V_{THCM}$ 254. In operation, the threshold common mode $V_{THCM}$ exhibits the common mode voltage of the differential threshold signals $V_{TH}$+ 260 and $V_{TH}$- 262.

Bases of at least a portion of the plurality of transistors 234 and 236 are cross-coupled to the threshold common mode $V_{THCM}$ 254 which exhibits the common mode voltage of the differential input signals $V_{TH}$+ 260 and $V_{TH}$- 262. Similarly, the bases of at least a portion of the plurality of transistors 238 and 240 are cross-coupled to the input signal common mode $V_{CM}$ 224 which exhibits the common mode voltage of the differential input signals $V_{IN}$+ 220 and $V_{IN}$- 222.

Figure 3:
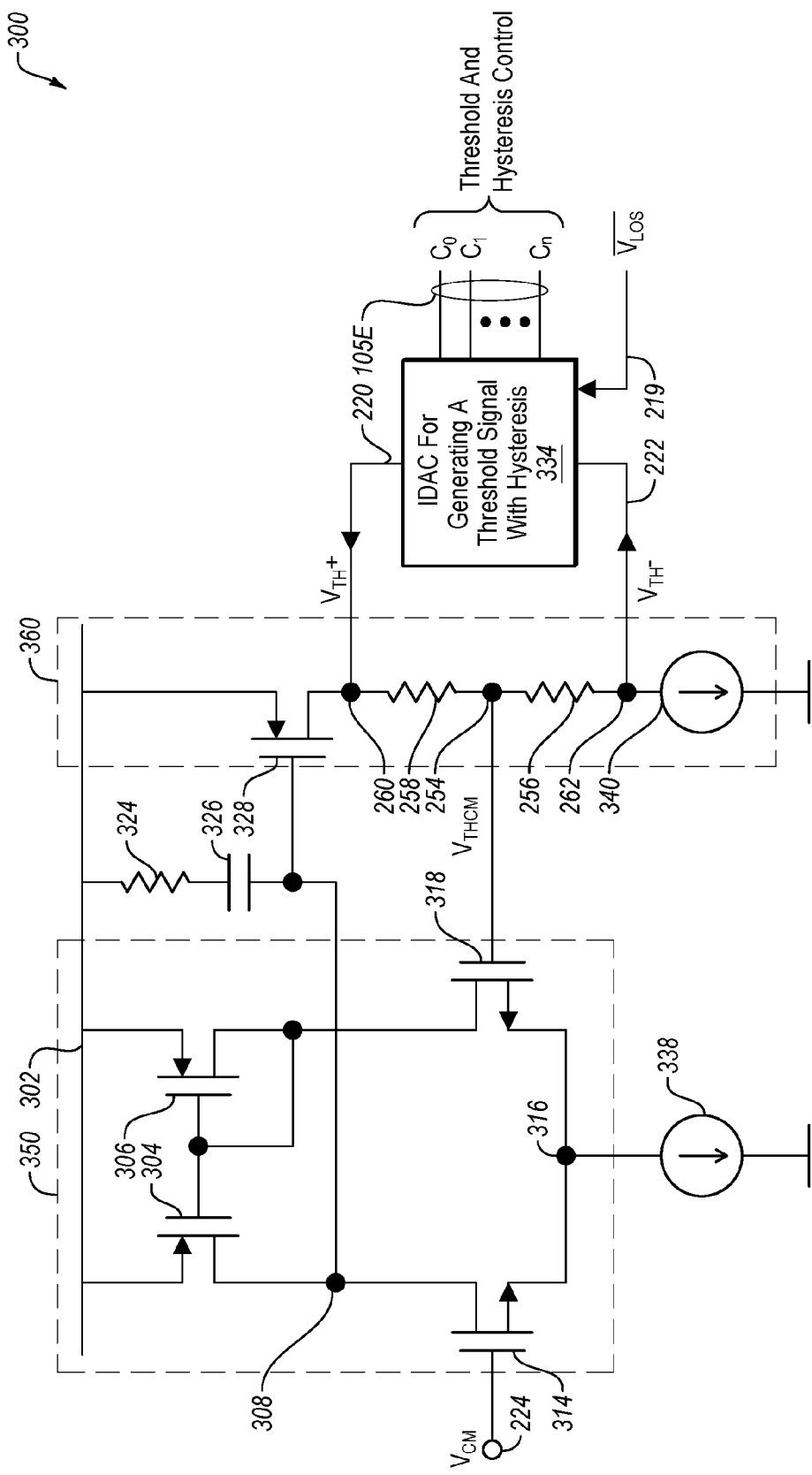
FIG. 3 illustrates a circuit diagram of a threshold signal generator, in accordance with an exemplary embodiment.

FIG. 3 illustrates a circuit diagram of threshold with hysteresis signal generator 300, such as the threshold with hysteresis signal generator 300 of FIG. 1. The threshold with hysteresis signal generator 300 generates the differential threshold signals $V_{TH}$+ 260 and $V_{TH}$- 262 which may correspond to the differential threshold signals $V_{TH}$+ 260 and $V_{TH}$- 262 of FIG. 1 and FIG. 2. The exemplary embodiments do not require the input signal common mode of the differential input signals $V_{IN}$+ 220 and $V_{IN}$- 222 be equal to the threshold signal common mode of the of the differential threshold signals $V_{TH}$+ 260 and $V_{TH}$- 262. However, the threshold with hysteresis signal generator 300 operates to cause the common mode signals $V_{CM}$ 224 and $V_{THCM}$ 254 (FIG. 2) to converge and be nearly equal in value. The threshold with hysteresis signal generator 300 includes an input signal common mode $V_{CM}$ at node 224 corresponding to the input signal common mode $V_{CM}$ 224 of FIG. 2, and a threshold signal common mode $V_{THCM}$ 254 corresponding to the threshold signal common mode $V_{THCM}$ 254 also of FIG. 2.

The threshold with hysteresis signal generator 300 includes a current mirror arranged as amplifier 350 including a pullup transistor 306 coupled at a source to a pullup voltage 302 and coupled at a drain to a feedback transistor 318. The drain and gate of the input pullup transistor 306 are shorted together in a diode load configuration. The feedback transistor 318 includes a drain coupled to the drain of the pullup transistor 306 and a source coupled to a constant current source 338 at node 316. The gate of feedback transistor 318 is coupled to the threshold signal common mode $V_{THCM}$ 254, which corresponds to the threshold signal common mode $V_{THCM}$ 254 of FIG. 2. The amplifier 350 further includes a load pullup transistor 304 coupled at a source to a pullup voltage 302 and coupled at a drain to an input transistor 314. The input transistor 314 is coupled at a gate to the input signal common mode $V_{CM}$ 224. The input transistor 314 includes a drain coupled to the drain of the output pullup transistor 304 and a source coupled to the constant current source 338 at node 316.

The threshold with hysteresis signal generator 300 further includes an output transistor 328 coupled at a source to the pullup voltage 302 and coupled at a drain to resistor 258, which corresponds to the resistor 258 of FIG. 2. The output transistor 328 further includes a gate coupled to the drain of the input transistor 314 at node 308 and is also coupled to a stabilization circuit including a resistor 324 and a capacitor 326.

The threshold with hysteresis signal generator 300 further includes a current digital-to-analog converter (IDAC) 334 for generating a threshold signal with hysteresis, as further described below. The IDAC 334 is responsive to control signals C0-Cn 105E and the inverted LOS indicator 219, and generates the differential threshold signals $V_{TH}$+ 260 and $V_{TH}$- 262.

In operation, the feedback transistor 318 provides negative feedback to amplifier 350 causing the voltage of the input common mode signal $V_{CM}$ 224 and the voltage of the threshold common mode signal $V_{THCM}$ 254 to converge. More specifically, the amplifier 350 senses the difference between the common mode voltages and attempts to reduce the difference. The constant current source 340 generates a bias current for feedback transistor 328.

Figure 4:
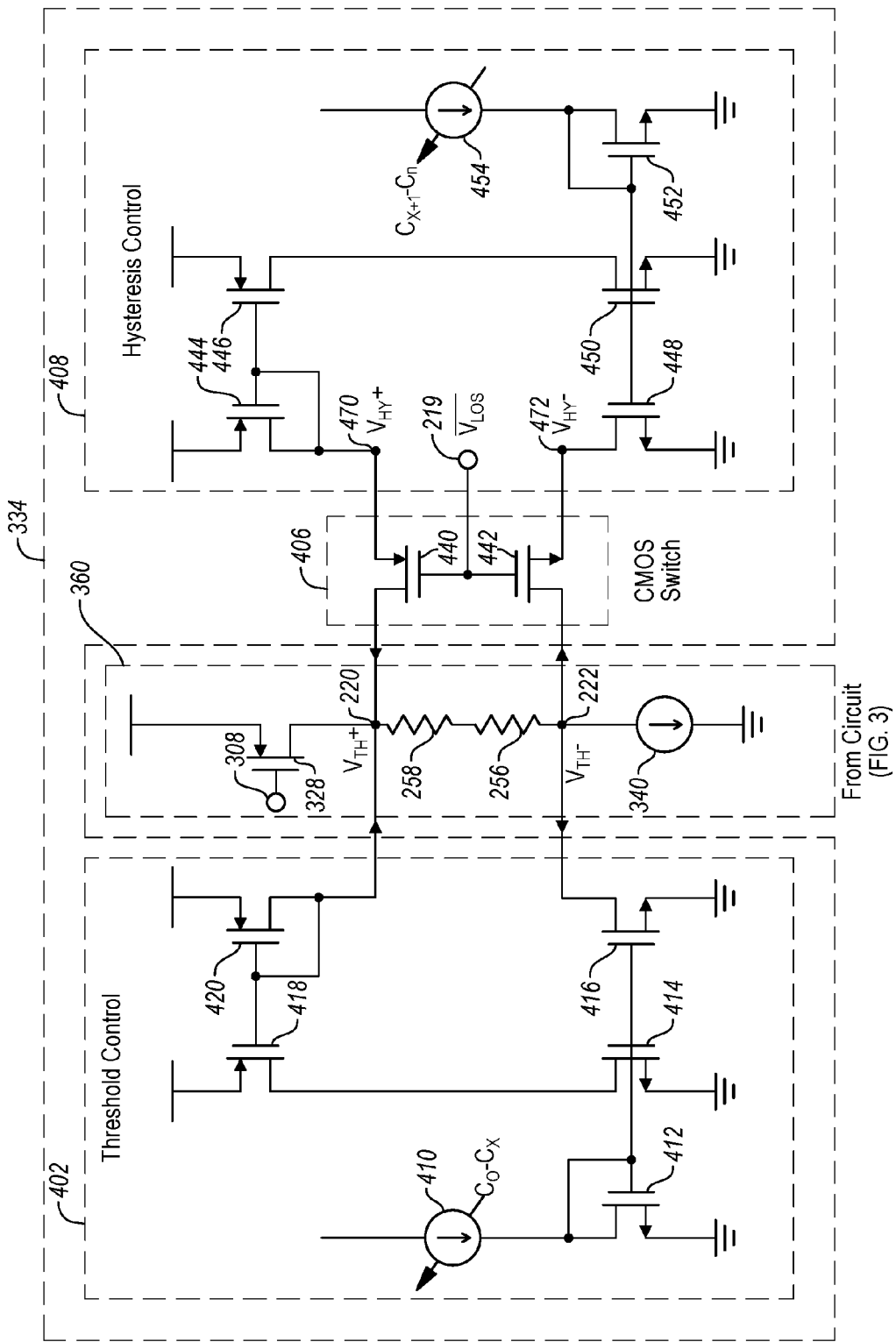
FIG. 4 illustrates a circuit diagram of a current digital-to-analog converter (IDAC) for generating a threshold signal with hysteresis, in accordance with an exemplary embodiment.

FIG. 4 illustrates a circuit diagram of a current digital-to-analog converter (IDAC) 334 for generating a threshold signal with hysteresis. The IDAC 334 is further illustrated as coupling to circuitry 360, which corresponds to circuitry 360 in FIG. 3. The IDAC 334 includes threshold control circuitry 402, switch circuitry 406 and hysteresis control circuitry 408.

The threshold control circuitry 402 includes a programmable current source 410 which is controlled by control signals C0-Cx of control signals 105E. The control signals C0-Cx set a current through transistor 412 which forms a current mirror with transistors 614 and 616. The current through transistor 614 is also drawn through transistors 418 and 420. The transistors 418 and 420 also form a current mirror. The output signals from the threshold control circuity 402 generates the differential threshold signals $V_{TH}$+ 260 and $V_{TH}$- 262 which couple to the circuitry 360 as described above with reference to FIG. 3.

The IDAC 334 further provides hysteresis control for stabilizing the LOS indicator 218 generated by the LOS detector 200. The hysteresis control circuitry 408 includes a programmable current source 454 which is controlled by control signals Cx+1-Cn of control signals 105E. The control signals Cx+1-Cn set a current through transistor 452 which forms a current mirror with transistor 450 and 448. The current through transistor 450 is also drawn through transistors 444 and 446. The transistors 444 and 446 also form a current mirror. The output signals from the hysteresis control circuity 408 generate the differential hysteresis signals $V_{HY}$+ 470 and $V_{HY}$- 472.

The IDAC 334 further includes switch circuitry 406 including pass transistors 440 and 442 configured to couple the differential hysteresis signals $V_{HY}$+ 470 and $V_{HY}$- 472 to the differential threshold signals $V_{TH}$+ 260 and $V_{TH}$- 262 when the inverted LOS indicator 219 is activated.

Figure 5:
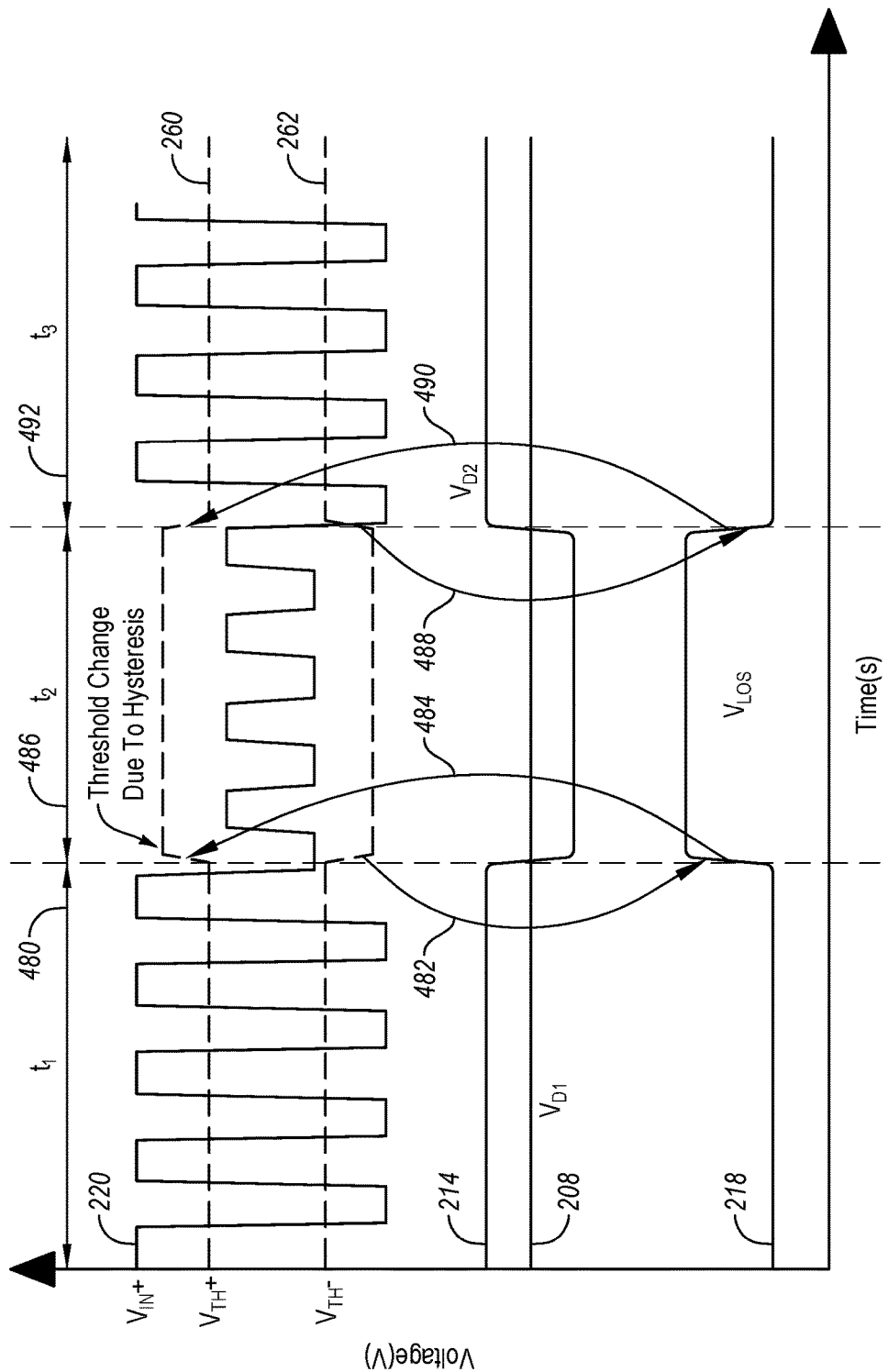
FIG. 5 illustrates a timing diagram for the LOS detector, in accordance with an exemplary embodiment.
Figure 6:
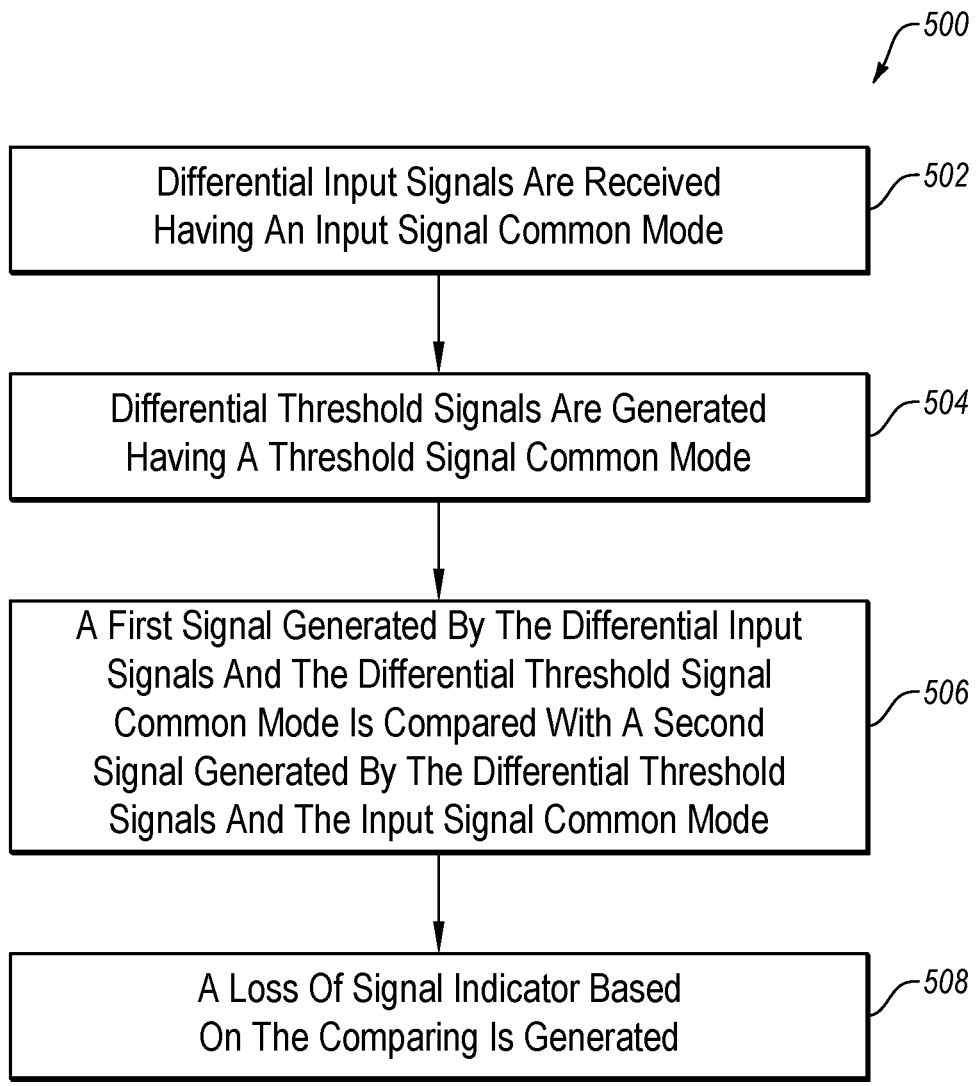
FIG. 6 illustrates a flowchart of a method for detecting an LOS, in accordance with an exemplary embodiment.

FIG. 5 illustrates a timing diagram for the LOS detector 200, in accordance with exemplary embodiments. The LOS detector 200 operates by comparing a input signal against a threshold signal. When the input signal is greater than the threshold signal, then the LOS indicator does not assert an indication of a loss of input signal.

In FIG. 5, a first phase $t_1$ 480 illustrates, for clarity, only a single one of the differential input signals $V_{IN}+$ 220 and $V_{IN}-$ 222. Specifically, the input signal $V_{IN}+$ 220 is illustrated as oscillating with a magnitude greater than the differential threshold signals $V_{TH}+$ 260 and $V_{TH}-$ 262. The differential threshold signals $V_{TH}+$ 260 and $V_{TH}-$ 262 are generated based upon the threshold control circuitry 402 of FIG. 4. In FIG. 5, the inputs signals $V_{D1}$ 208 and $V_{D2}$ 214 to the comparator 216 of FIG. 2 are also illustrated. During the first phase $t_1$ 480, the comparator 216 receives a higher level on input signal $V_{D1}$ 208 than on input signal $V_{D2}$ 214. Accordingly, the comparator 216 does not assert the LOS indicator 218 to indicate a loss of signal.

In FIG. 5, a second phase $t_2$ 486 illustrates the input signal $V_{IN}+$ 220 as oscillating with a magnitude less than the differential threshold signals $V_{TH}+$ 260 and $V_{TH}-$ 262. Accordingly, the comparator 216 receives a lower level on input signal $V_{D1}$ 208 than on input signal $V_{D2}$ 214. Accordingly as illustrated by transition 482, the comparator 216 does assert the LOS indicator 218 to indicate a loss of signal. The assertion of the LOS indicator 218 causes the switch circuitry 406 of FIG. 4 to activate and allow the differential hysteresis current generated at $V_{HY}+$ 470 and $V_{HY}-$ 472 by the hysteresis circuitry 408, to affect the voltages present at the differential threshold signals Vth+ 260 and Vth− 262, as illustrated by transition 484. As illustrated in FIG. 5, the hysteresis-affected differential threshold signals $V_{TH}+$ 260 and $V_{TH}-$ 262 are increased in magnitude to prevent any short-term oscillation (chattering) of the LOS indicator 218 due to conditions where the difference of the input signal $V_{IN}$ and the threshold signal $V_{TH}$ oscillate.

In FIG. 5, a third phase $t_3$ 492 illustrates the input signal $V_{IN}+$ 220 as again oscillating with a magnitude greater than the differential threshold signals $V_{TH}+$ 260 and $V_{TH}-$ 262. Accordingly, the comparator 216 receives a higher level on input signal $V_{D1}$ 208 than on input signal $V_{D2}$ 214. Accordingly as illustrated by transition 488, the comparator 216 deasserts the LOS indicator 218 to refrain from indicating a loss of signal. The deassertion of the LOS indicator 218 causes the switch circuitry 406 of FIG. 4 to deactivate and prevent the differential hysteresis current generated at $V_{HY}+$ 470 and $V_{HY}-$ 472 by the hysteresis circuitry 408, from affecting the voltages present at the differential threshold signals $V_{TH}+$ 260 and $V_{TH}-$ 262, as illustrated by transition 490. As illustrated in FIG. 5, the hysteresis-unaffected differential threshold signals $V_{TH}+$ 260 and $V_{TH}-$ 262 are reduced in magnitude to prevent any short-term oscillation of the LOS indicator 218 due to conditions where the difference of the input signal $V_{IN}$ and the threshold signal $V_{TH}$ oscillate.

FIG. 5 illustrates a flowchart of a method for detecting a loss of signal, in accordance with an exemplary embodiment, arranged in accordance with at least some embodiments described herein. Although illustrated as discrete blocks, various blocks may be divided into additional blocks, combined into fewer blocks, or eliminated, depending on the desired implementation.

The method 500 may begin at block 502 where differential input signals $V_{IN}$ are received having an input signal common mode $V_{CM}$. In block 504, differential threshold signals $V_{TH}$ are internally generated having a threshold signal common mode $V_{THCM}$. In block 506, a first signal $V_{D1}$ generated by the differential input signals $V_{IN}$ and the differential threshold signal common mode $V_{THCM}$ is compared with a second signal $V_{D2}$ generated by the differential threshold signals $V_{TH}$ and the input signal common mode $V_{CM}$. In block 508, a loss of signal indicator LOS based on the comparing is generated.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A device, comprising:
    a loss of signal (LOS) detector, including:
        a comparator including a first input, a second input and an output; and
        a circuit configured to compare a first signal on the first input generated by differential input signals and a threshold signal common mode with a second signal on the second input generated by differential threshold signals at a first level and an input signal common mode, the circuit further configured to generate a LOS indicator on the output based on the compare.

2. The device of claim 1, further comprising a threshold signal generator configured to adjust the differential threshold signals to a second level when the LOS indicator is asserted.

3. The device of claim 2, wherein the second level of the differential threshold signals provides hysteresis for the LOS indicator.

4. The device of claim 3, wherein the first level of the differential threshold signals is separately programmable from the second level of the differential threshold signals.

5. The device of claim 1, wherein the circuit includes a current mirror including an input stage coupled to the first input of the comparator and an output stage coupled to the second input of the comparator, the input stage configured to receive differential input signals having an input signal common mode and the output stage configured to receive differential threshold signals having a threshold signal common mode, the input signal common mode coupled to the output stage and the threshold signal common mode coupled to the input stage.

6. The device of claim 5, wherein the input stage includes an input pullup transistor and a bias stage at least partially controlled by the threshold signal common mode.

7. The device of claim 6, wherein the bias stage includes at least first pair of transistors respectively controlled by the differential input signals.

8. The device of claim 7, wherein the bias stage further includes at least a second pair of transistors controlled by the threshold signal common mode.

9. The device of claim 8, wherein the first pair and second pair of transistors are substantially identical.

10. The device of claim 5, wherein the output stage includes an output pullup transistor and a load stage at least partially controlled by the input signal common mode.

11. The device of claim 10, wherein the load stage includes at least third pair of transistors respectively controlled by the differential threshold signals.

12. The device of claim 11, wherein the load stage further includes at least a fourth pair of transistors controlled by the input signal common mode.

13. The device of claim 5, further comprising a constant current source coupled to both the input stage and the output stage.

14. The device of claim 5, wherein the threshold common mode is adjustable based at least in part on the input signal common mode.

15. The device of claim 5, further comprising a threshold signal generator configured to converge the threshold common mode toward the input signal common mode.

16. The device of claim 15, wherein the threshold signal generator includes a current digital-to-analog converter (IDAC) configured to adjust the threshold common mode.

17. A method of detecting a loss of signal (LOS), comprising:
    receiving differential input signals having an input signal common mode;
    receiving differential threshold signals at a first level having a threshold signal common mode;
    comparing a first signal generated by the differential input signals and the threshold signal common mode with a second signal generated by the differential threshold signals and the input signal common mode; and
    generating an LOS indicator based on the comparing.

18. The method of claim 17, further comprising adjusting the differential threshold signals to a second level when the LOS indicator is asserted.

19. The method of claim 18, wherein the second level generates hysteresis for the LOS indicator.

20. The method of claim 19 wherein the first level of the differential threshold signals is separately programmable from the second level of the differential threshold signals.

\* \* \* \* \*